United States Patent [19]
Scholz

[11] 4,083,517
[45] Apr. 11, 1978

[54] REVERSIBLE DRIVE TRANSMISSION FOR STRIP HANDLING SYSTEMS

[75] Inventor: Donald T. Scholz, Wayland, Mass.

[73] Assignee: Polaroid Corporation, Cambridge, Mass.

[21] Appl. No.: 756,418

[22] Filed: Jan. 3, 1977

[51] Int. Cl.² .................... G03B 1/04; G11B 15/32
[52] U.S. Cl. ................... 242/201; 242/67.4; 242/205
[58] Field of Search ................ 242/200–205, 242/67.4; 346/94–96; 74/665 R, 665 A, 665 B, 665 E, 665 G, 665 GD, 724

[56] References Cited

U.S. PATENT DOCUMENTS

| 3,179,948 | 4/1965 | Schilling et al. | 346/95 |
| 3,266,745 | 8/1966 | Benson | 242/67.4 |

Primary Examiner—Harvey C. Hornsby
Attorney, Agent, or Firm—David R. Thornton

[57] ABSTRACT

A reversible drive transmission particularly suited for use in cassette contained film strip handling apparatus in which a film strip connected at opposite ends to supply and take-up spools is transported between the spools in one direction as for projection and in an opposite direction as in rewinding. A unidirectional input torque is transmitted by the transmission to one or the other of two drive spindles by a shiftable worm carrying shaft extending between and thus on opposite sides of drive spindle connected worm gears. The shaft and worms carried thereon, being driven in one direction, are alternately engaged with a take-up spool driving worm gear or a supply spool driving worm gear depending on the pivotal orientation of the worm carrying shaft. This shaft is supported rotatably on a shift plate pivotally supported from a fixed chassis structure and moved between positions of engagement with the respective spindle worm gears by a logic disc programming overall system operation. A logic disc follower and bracket assembly is pivoted for movement independently of the shift plate but connected therewith by a torsion spring to permit a biased loading of the shaft carrying worms in their respective worm gear engaging positions.

14 Claims, 4 Drawing Figures 4,083,517

REVERSIBLE DRIVE TRANSMISSION FOR STRIP HANDLING SYSTEMS

BACKGROUND OF THE INVENTION

This invention relates to drive mechanisms and more particularly, it concerns an improved drive mechanism for alternately driving one or the other of two rotatable spindles in opposite directions incident to feeding a tape or film strip between supply and take up spools.

The passage of a tape or film strip in opposite directions between a pair of spools to which opposite ends of the strip are fixed has traditionally involved the connection of a reversible motor alternately to the particular one of the two spools on which the strip is being wound while the other spool is allowed to rotate and unwind under the tension in the strip. Although such reversible motor drive systems are acceptable when the motor is deployed primarily to wind the strip on one or the other of the two spools, problems arise in this approach to film strip winding and rewinding where the motor is used also as a source of drive torque for other operating components.

In the motion picture viewing art, for example, viewing devices have been developed by which a film strip connected at opposite ends to supply and take-up spools supported within a film cassette is, after exposure, processed or developed, projected and rewound automatically in accordance with information supplied by the processed or unprocessed state of the cassette contained film strip. Exemplary disclosures of such systems are found in U.S. Pat. Nos. 3,771,862 issued Nov. 13, 1973 to Edwin H. Land and 3,941,465 issued Mar. 2, 1976 to Irwin E. Figge et al. In such viewer systems, the processed or unprocessed state of the cassette is detected electrically and used to position or index a programming cam system by which the apparatus will be operated automatically in either "project," "process," "rewind" or "off" modes of operation. Such systems must necessarily incorporate numerous driven components in addition to the cassette contained supply and take-up spools between which the film strip must be wound and unwound as during the project and rewind operations. Such additional driven components will include an incremental film feeding shuttle, an optical shutter, a cooling fan as well as indexing movement of the cam system by which the overall apparatus is programmed to the several modes of operation. Also, it is to be noted that with the exception of the direction of film strip travel, all such additional components are desirably driven in one direction only.

While such viewer systems in the past have required more than one electric motor, it is desirable from the standpoint of both economy and synchronous operation of system components, to employ only one electric motor for all components. Because the direction of film strip supply and take-up spool rotation is the only reversible component, it is also advantageous to arrange such a single drive motor to rotate in one direction only.

SUMMARY OF THE PRESENT INVENTION

In accordance with the present invention, a shiftable drive transmission is provided for use particularly, though not exclusively, in tape and film handling systems to transmit an unidirectional rotary input to one or the other of two drive spindles coupled to strip attached spools in a manner to drive the respective spools in opposite directions. In general, the transmission includes a pair of drive worms on a common drive shaft extending between and thus on opposite sides of a pair of drive spindle connected worm gears. The drive shaft and worms are supported for rotation on a shift plate pivotal on an axis parallel to the drive spindle worm gears such that only one of the spindle connected worm gears will be engaged by a shaft carried worm at any given time. The drive shaft is coupled with a unidirectional drive shaft which may be continuously driven inasmuch as the shaft carried worms will not drive either of the spindle worm gears unless the shaft carried worm is pivoted to engagement therewith. Moreover, the position of the drive shaft and worms on opposite sides of the pair of spindle connected worm gears will effect a reversal of spindle rotation without changing the direction of drive shaft rotation.

The shift plate on which the drive shaft and worms are carried is provided with a cam follower bracket pivotal independently of the shift plate but coupled to the plate by a double acting torsion spring. The bracket carries a cam follower engageable with a system programming cam disc in a manner such that the film spool driving spindle to which torque is transmitted will be correlated with system operation. Moreover, the double acting torsion spring accomodates a deliberate cam overthrow by which the shaft carried worms and spindle connected worm gears may be retained against separation when engaged. Also, the drive shaft may be coupled to a motor shaft through an adjustable slip clutch by which torque transmitted by the drive shaft may be limited.

Among the objects of the invention are therefore:

the provision of an improved drive transmission for alternately coupling a single unidirectional drive input to one or the other of two rotatable spindles in a manner to drive such spindles in opposite directions;

the provision of such a drive mechanism having particular utility in tape or film strip handling systems in which tape or film feed in opposite directions is effected by driveably rotating one or the other of two spools;

the provision of such a drive transmission which is exceedingly compact and simply constructed;

the provision of such a drive transmission which is readily controlled by a cam track configuration on a programming cam disc having other system related control functions; and the provision of such a drive transmission in which meshing engagement of alternately connected gears is assured in a simple but effective manner.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
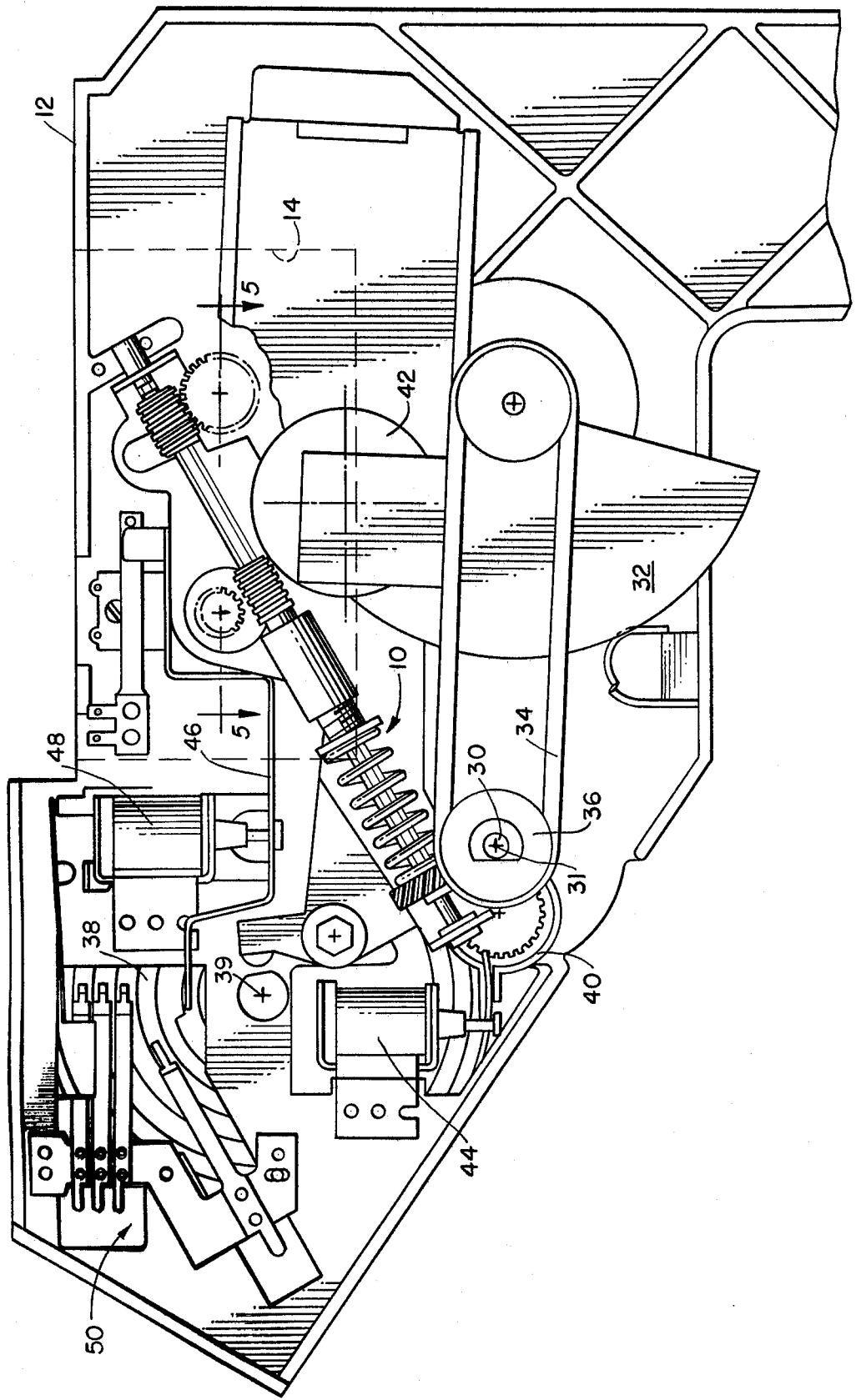
FIG. 1 is a fragmentary side elevation illustrating an interior chassis component of a multi-program motion picture processing and viewing apparatus incorporating the drive transmission of the present invention.
Figure 2:
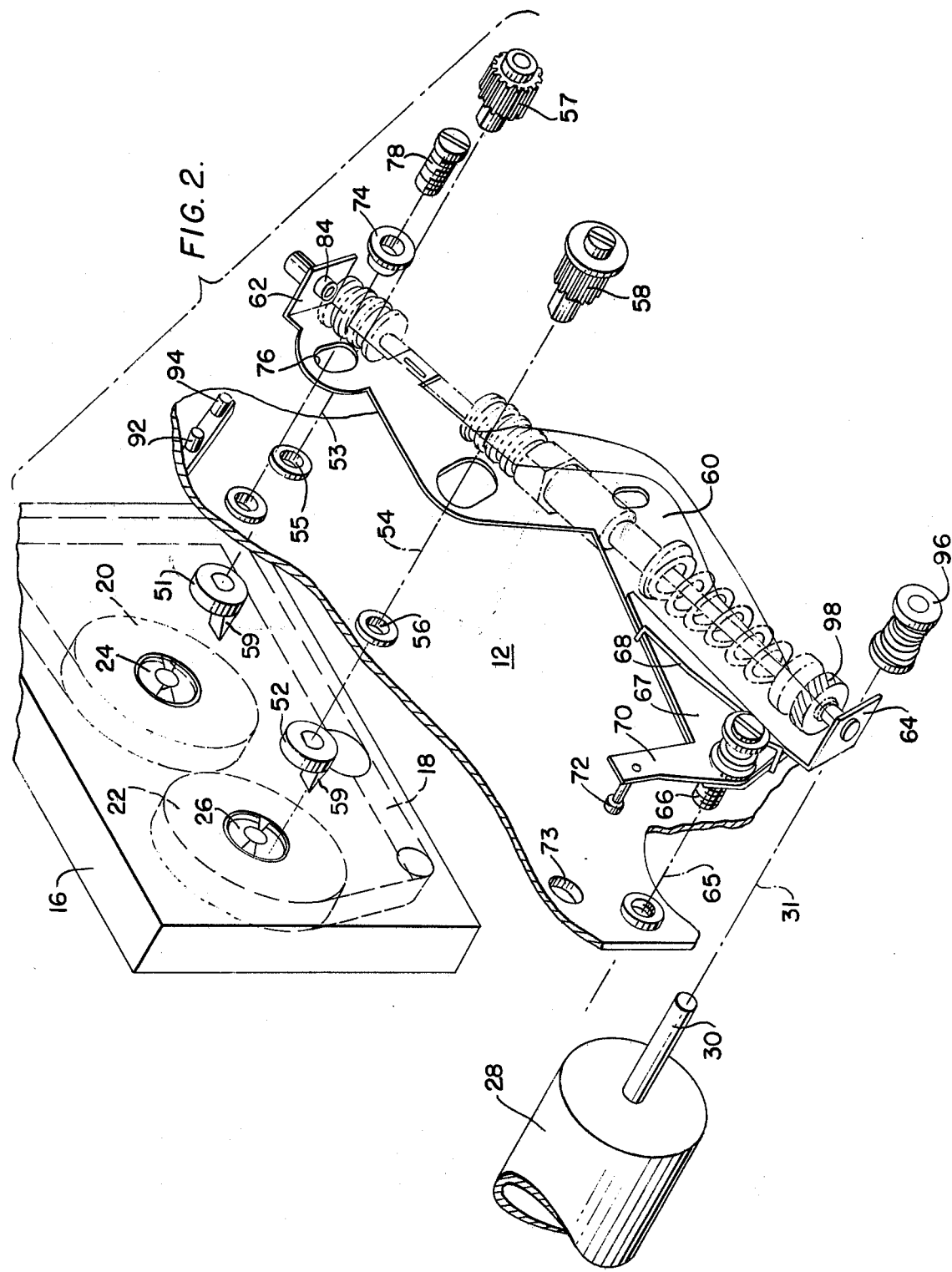
FIG. 2 is a fragmentary exploded perspective view illustrating individual components of the drive transmission as well as the film cassette adapted to be driven thereby.

In FIGS. 1 and 2 of the drawings, the drive transmission of the present invention is generally designated by the reference numeral 10 and shown mounted on one side of a plate-like chassis member 12 providing primary support for various components incorporated in a multi-program motion picture viewing apparatus. Although much of the viewing apparatus has been omitted in the interest of more clearly illustrating the drive transmission of the present invention, the plate member 12 defines on the side thereof opposite from that shown in FIG. 1, an upwardly opening cassette well 14 for receiving a·multi-purpose film cassette 16. As shown in FIG. 2, the cassette 16 is a light-tight enclosure of generally rectangular parallelepiped configuration and houses a film strip 18 connected between rotatable suppy and take-up spools 20 and 22 respectively. Each of the spools is provided with a central drive sprocket 24 and 26 exposed on one side of the cassette exterior.

All operative components of the viewing apparatus supported by the chassis member 12 are operated by a common unidirectional electric motor 28 also supported on the member 12 and having an output shaft 30 on an axis 31. Viewer components visible in FIG. 1 of the drawings include a shutter 32 driven by way of a belt 34 and pulley 36 keyed for rotation with the motor shaft 30; a logic disc 38 adapted to be rotatably indexed about an axis 39 by a latch gear assembly 40 coupled also to the motor shaft 30; a projection lamp 42; a latch gear actuating solenoid 44; a cassette eject bar 46; an eject bar lifting solenoid 48; and a control switch block assembly 50. While an understanding of these viewer components is not necessary to a complete understanding of the drive transmission 10, the illustration of these components serves to depict the environment in which the transmission is primarily intended for use.

As shown most clearly in FIG. 2 of the drawings, a pair of spindle drive heads 51 and 52 are adapted to be supported rotatably on axes 53 and 54 to be aligned with the supply and take-up spool drive sprockets 24 and 26 when the cassette 16 is positioned in the well 14 of the viewing apparatus. The spindle drive heads are journalled in bearing apertures 55 and 56 formed in the plate-like chassis member 12 and keyed for rotation with supply and take-up worm gears 57 and 58 respectively. It will be noted that each of the spindle drive heads 51 and 52 is provided with a one way driving pall 59 which, in operation, cooperates with the respective spool drive sprockets 24 and 26 to drive the respective spools 20 and 22 in one direction only. In other words, the take-up spool 22 will be driven during passage of the film strip 18 from the supply spool 20 to the take-up spool, whereas the supply spool 20 will be driven in the opposite direction during transport of the film strip 18 from the take-up spool 22 back to the supply spool as during a rewinding operation.

Figure 3:
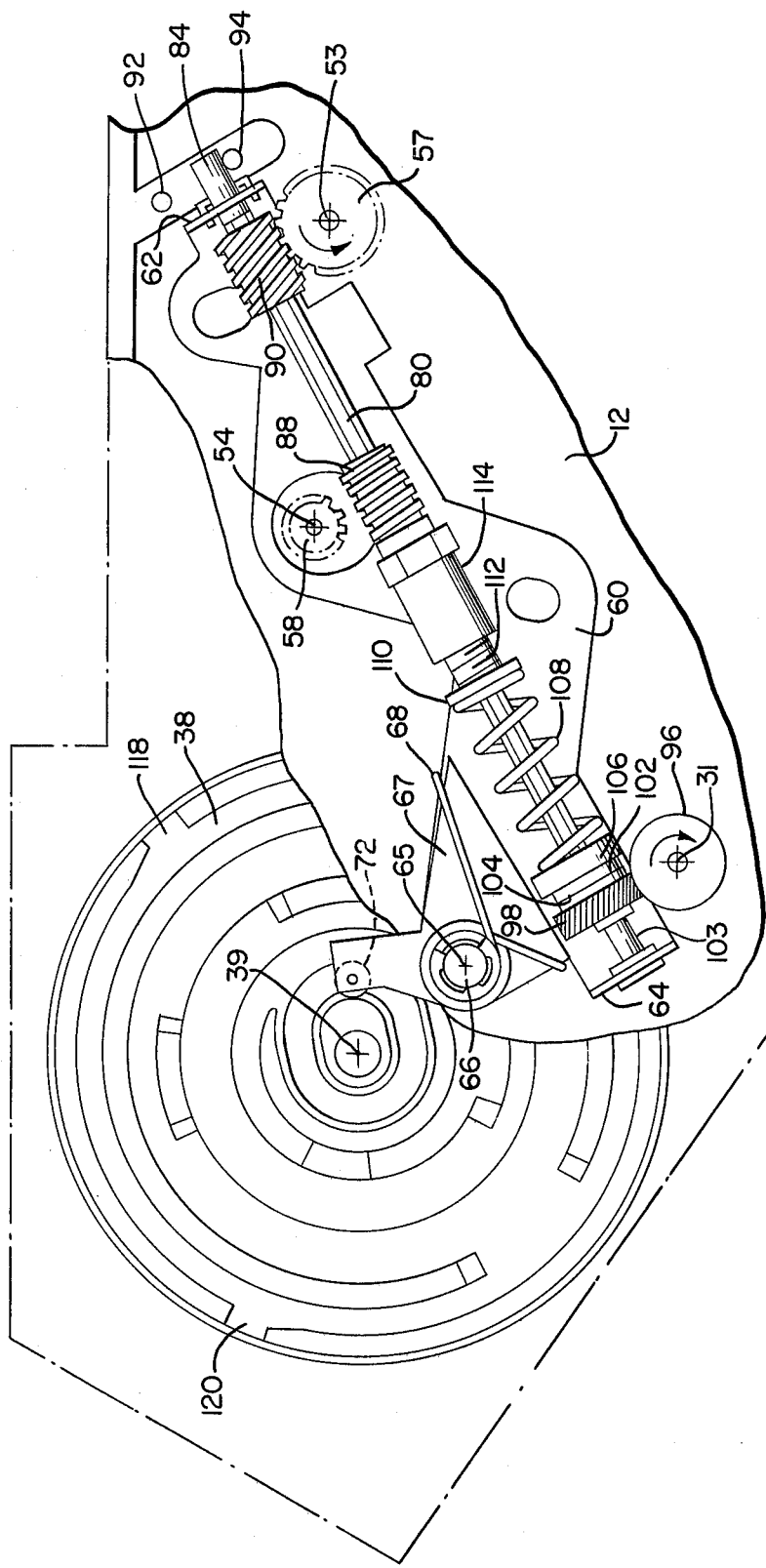
FIG. 3 is a fragmentary side elevation illustrating the drive transmission of the present invention and one operative condition.
Figure 4:
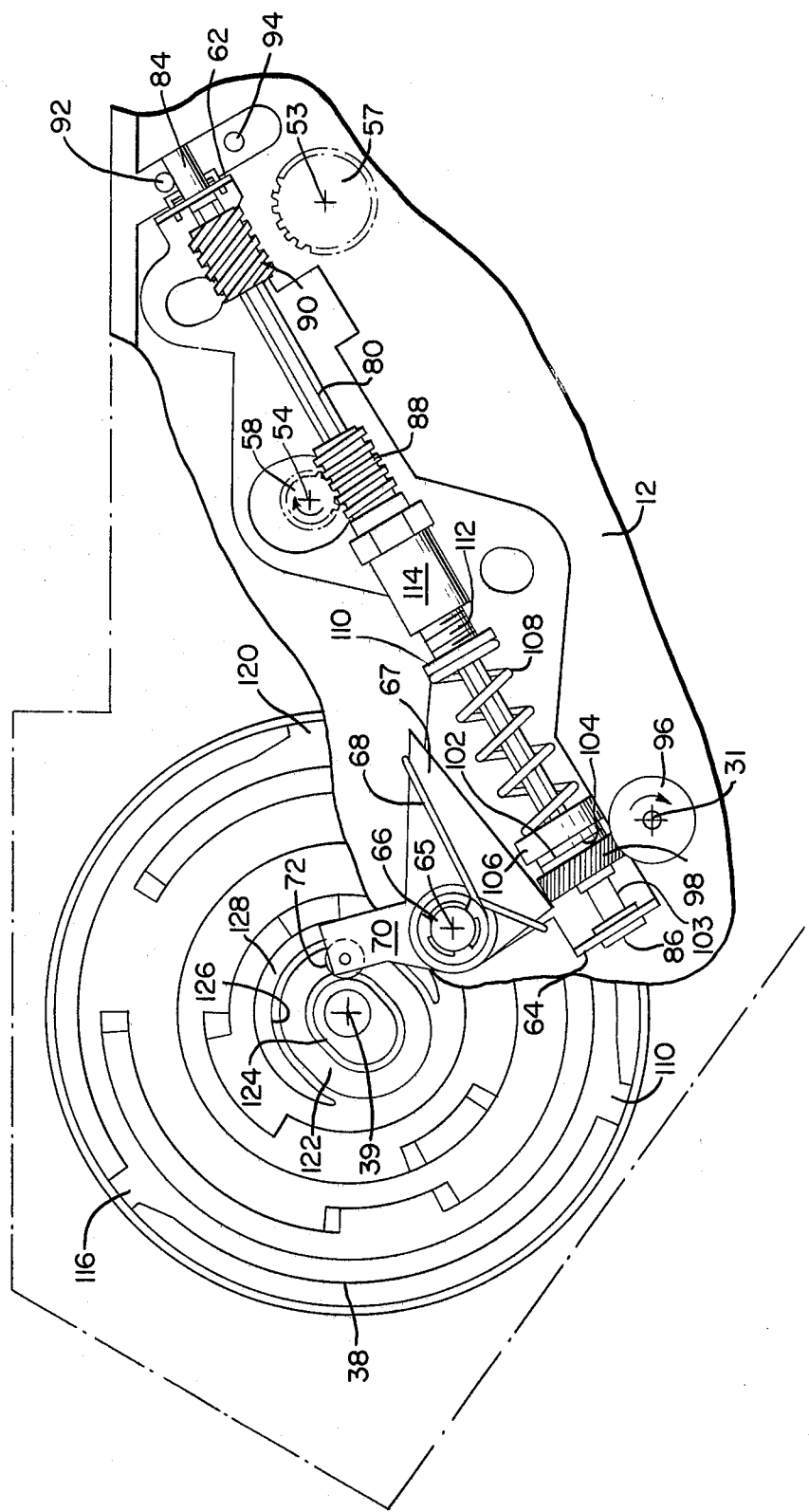
FIG. 4 is a view similar to FIG. 3 but illustrating the transmission in an alternative drive condition.

The manner in which drive torque is transmitted from the motor shaft 30 to the drive spindle heads 51 and 52 may be understood by reference to FIGS. 2-4 of the drawings. As shown in these figures, the transmission 10 includes a shift plate 60 having a somewhat S-shaped peripheral contour and formed with out turned flanges 62 and 64 at opposite upper and lower ends, respectively. The plate 60 is supported along the side of the plate member 12 for pivotal movement about an axis 65 by a pivot bolt 66. The bolt 66 also extends through a bracket plate 67 having a triangular portion overlying the lower end portion of the shift plate 60. The bracket plate is yieldably restrained against pivotal movement on the axis 65 independently of the shift plate by a double acting torsion spring 68. The bracket 67 includes an upstanding arm portion 70 supporting near its upper end a cam follower 72. As shown in FIG. 2, the cam follower 72 projects in parallel with the pivot axis 65 and is aligned to extend through a cam follower opening 73 in the member 12 for engagement with the side of the programming cam disc 38 illustrated in FIGS. 1, 3 and 4 and in a manner to be described.

The upper end of the plate 60 is supported for limited movement in a plane normal to the axis 65 by a flanged collar 74 adapted to extend through a slot-like aperture 76 in the shift plate 60 and be secured against the member 12 by a screw 78. This organization functions to guide pivotal movement of the shift plate in a plane perpendicular to the pivot axis 65.

As may be seen in FIGS. 3 and 4, the shift plate 60 carries a power transmission shaft 80 by way of end bearing journals 84 and 86 mounted in the respective end flanges 62 and 64, for free rotation on its longitudinal axis which extends in an upwardly inclined relationship under the take-up spool axis 54 and over the supply spool axis 53. Worms 88 and 90 are positioned on the transmission shaft 80 to engage either one or the other of the respective take-up and supply spool worm gears 57 and 58 depending on the pivotal position of the shift plate 60. In this latter respect, it will be noted that the upper shaft journal 84 is extended beyond the flange 62 as an extension of the shaft 80 and positioned between a pair of pins 92 and 94 extending from the upper side of the chassis member 12. Thus, when the shaft extension is located against the pin 94, as shown in FIG. 3 the worm 90 will be in engagement with the supply spool drive gear 57 whereas the worm 88 will be displaced out of engagement with the take-up worm gear 58. Movement of the shaft extension against the pin 92 as shown in FIG. 4, however, will move the worm 88 into engagement with the take-up worm gear 58 and displace the worm 90 out of engagement with the supply spool worm gear 57. Thus, it will be seen that for a given rotation of the shaft 80 and worms 88 and 90, rotation of the supply spool gear 57 during engagement thereof by the worm 90 will drive the supply spool gear in a rewind direction whereas the same direction of rotation in the worm 88 during engagement thereof with the take-up spool worm gear 58 will effect rotation of the gear 58 in an opposite direction in which the film strip 18 is wound on the supply spool 22. Also, it will be noted in FIGS. 3 and 4 that the worms 88 and 90 are pitched in the same direction but that the worm 90 has a greater pitch angle than the worm 88. This enables the supply spool 20 to be rotated in a rewind direction at a speed faster than the speed at which the take-up spool 22 is driven for a given rotation of the shaft 80.

The transmission of drive torque from the motor shaft 30 through the shaft 80 to the respective spool worm gears 57 and or 58 is effected by a helical gear 96 keyed on the motor shaft 30 and in meshing engagement with a helix gear 98 rotatably supported on the shaft 80. The gear 98 is provided with a clutch face 102 and is mounted on a circular end portion 103 of the shaft 80. A cooperating clutch face 104 is carried by a plate 106 coupled to the shaft 80 by virtue of a hexagonal or otherwise non-circular shaft cross-section extending from the end portion 103 along the remaining length of the shaft to the journal 84 at the upper end thereof. The clutch faces 102 and 104 are retained in engagement by a concentric compression spring 108 extending between the plate 106 and a collar 110 integrally formed on the externally threaded portion 112 of an adjustment screw assembly 114. It will be appreciated that torque transmitted through the friction clutch faces 102 and 104 will be dependent on the axial force exerted by the spring 108 and that such force will be adjustable by virtue of the assembly 114. Thus, the motor shaft torque is transmitted through the worm gear 96 to the gear 98 and then to the shaft 80 by way of the clutch faces 102 and 104. In practice, the clutch faces may be adjusted so that the torque transmitted to the shaft 80 will be limited such that upon reaching the end of the film strip as during rewind, for example, rotation of the supply spool will cease without breaking the film strip even though the motor torque continues to be transmitted to the gear 98.

As mentioned above, movement of the shift plate 60 between the positions illustrated in FIGS. 3 and 4 of the drawings is effected by engagement of the cam follower 72 with the system logic disc 38. In the particular system with which the transmission 10 of this invention is particularly designed for use, the logic disc 38 is indexible to three angular positions in which notches 116, 118 and 120 are engaged by the latch gear assembly (FIG. 1) to retain the logic disc 38 against rotation. Release of the disc from a latched indexed position is effected by energization of the solenoid 44. Such energization of the solenoid 44 also initiates engagement of the drive motor shaft 30 with periphery of the logic disc to effect rotation thereof between the respective indexed position. Also, it might be mentioned that the three indexed positions of the logic disc represent "project," "rewind/process" and "off" operational modes to which the viewing system incorporating the drive transmission is programmed. The significance of this aspect of the logic disc 38 is that in the project mode, the film strip 18 is transported from the supply spool 20 to the take-up spool 22 thus requiring the take-up spool 22 to be driven by engagement of the worm 88 with the worm gear 54 as depicted in FIG. 4 of the drawings. Conversely, in the rewind/process mode of operation, the film strip is transported from the take-up spool 22 back to the supply spool 20 by driving the supply spool 20 through the worm gear 57 and worm 90 shown in FIG. 3.

The logic disc 38 is provided near its axis of indexing rotation 39 with a cam track 122 in which the follower 72 is received. As shown in FIGS. 3 and 4, cam track 122 is generally of eliptical or oblong configuration and generally eccentric with respect to the axis 39. Also, the track 122 is defined by inner and outer cam follower engaging surfaces 124 and 126, the outer surface 126 being formed by an axially extending wall 128 on the logic disc which does not extend completely around the cam track 122.

By a comparison of FIGS. 3 and 4, it will be seen that movement of the follower 72 in a direction to pivot the shift plate 60 so that the worm 90 engages the worm gear 57 is effected solely by the inner camming surface 124 which is designed with an overthrow such that the follower bracket 67 is moved against the bias of the torsion spring with respect to the shift plate 60. The shift plate is limited in movement about the pivot axis 65 by engagement of the journal extension 84 with the pin on the plate-like chassis member 12. Loading of the shift plate 60 and shaft 80 against the pin 94 serves to assure engagement of the worm 90 with the worm gear 57. Yet, and because of the limit provided by the pin 94, the worm 90 will not be engaged with the worm gear 57 in such force as to create unnecessary binding or frictional forces.

Similar action occurs when the worm 88 is engaged with the worm gear 58 as shown in FIG. 4. In this instance, the outer cam surface 126 operates to overthrow the cam follower 72 to pivot the bracket 67 beyond pivotal movement of the shift plate 60 about the axis 65 to a point where the pin 92 is engaged by the end journal 84.

It will be noted that the helix gear 98 undergoes a slight swinging movement with respect to the helical gear 96 with which engaged thereby. Movement, however, is accomodated by the axial length of the helical gear 98 and the play or tolerance permitted by helical gears of this type to accomodate such movement.

Thus it will be seen that by this invention there is provided an improved drive mechanism by which the aforementioned objectives are completely fulfilled. It will also be apparent to those skilled in the art that various modifications can be made in the embodiment described above and illustrated in the accompanying drawings without departure from the inventive concepts manifested by the disclosed embodiment. It is expressly intended therefore, that the foregoing description and accompanying drawing illustrations are illustrative of a preferred embodiment only, not limiting, and that the true spirit and scope of the present invention be determined by reference to the appended claims.

What is claimed is:

1. A drive mechanism for transmitting torque alternately to one or the other of two spaced apart spools mounted for rotation on parallel axes, said mechanism comprising:

first and second spaced apart gears, said first and second gears being substantially coplanarly mounted for rotation about parallel axes;

means for respectively coupling said first and second gears to the spools;

a drive shaft having longitudinally spaced apart first and second gear portions for coupling to said first and second gears;

means for rotatably supporting said drive shaft so as to extend between said spools in a plane approximately perpendicular to the axes of rotation of said first and second gears and so that said spaced apart gear portions of said drive shaft are respectively disposed in close proximity to said first and second gears;

means for pivotally mounting said drive shaft supporting means for movement about an axis located longitudinally of said spaced apart gear portions and substantially parallel to the axes of said first and second gears between a first position wherein a first of said gear portions is in gear engaging relationship with said first gear while said second gear portion is out of gear engagement with said second gear, and a second position wherein said second gear portion is in gear engaging relationship with said second gear while said first gear portion is out of gear engagement with said first gear;

means for unidirectionally rotating said drive shaft; and means for selectively pivoting said mounting means between its said first and second positions whereby said drive shaft imparts a rotational motion to said first gear in a first direction when said drive shaft is in its said first position and imparts a rotational motion to said second gear in a direction opposite said first direction when said drive shaft is in its said second position.

2. The mechanism of claim 1 wherein said first and second gears are worm gears and said first and second gear portions are worm portions.

3. The mechanism of claim 1 wherein said means for unidirectionally rotating said drive shaft includes a third gear adapted to be driven by a motor about an axis substantially parallel to the axes of said first and second gears and a fourth gear mounted on said drive shaft and disposed in gear engagement with said third gear, said third and fourth gears and the pivot axis of said means for pivotally mounting said drive shaft supporting means being located relative to each other so that said third and fourth gears are in engagement when said drive shaft supporting means is in both its said first and second positions.

4. The mechanism of claim 3 wherein said fourth gear is generally planarly aligned with the plane passing between the axis of rotation of said third gear and the pivot axis of said means for pivotally mounting said drive shaft supporting means.

5. The mechanism of claim 3 wherein said third and fourth gears are helical gears.

6. The mechanism of claim 2 wherein said first gear portion is a worm having a first pitch angle and said second gear portion is a worm having a pitch angle different from said first pitch angle whereby said first and second gears are automatically driven at different rates.

7. The mechanism of claim 1 wherein said means for selectively pivoting said drive shaft supporting means includes a bracket mounted for pivotal motion between first and second positions and spring means interconnected between said bracket and said supporting means for resiliently urging said supporting means between its said first and second positions responsive to said bracket being displaced between its said first and second positions.

8. The mechanism of claim 7 wherein said means for selectively pivoting said drive shaft supporting means additionally includes a logic disc having a cam track formed therein and a cam follower mounted on said bracket and positioned in said cam track.

9. The mechanism of claim 1 wherein said means for selectively pivoting said drive shaft supporting means includes a logic disc having at least one cam surface formed thereon and a cam follower connected to said means for pivotally mounting said drive shaft supporting means disposed in operative relationship with said cam surface.

10. The mechanism of claim 1 additionally including a slip clutch axially disposed along said drive shaft.

11. The mechanism of claim 1, additionally including a pair of fixed stops respectively engageable by said drive shaft when it is pivoted to its said positions whereby said stops permit gear engagement when said drive shaft is in its said first and second position without excessive force on said first and second gears.

12. The mechanism of claim 11 wherein said means for selectively pivoting said mounting means includes a torsion spring arrangement for loading said drive shaft against said stops.

13. The mechanism of claim 1 wherein said first and second gears are worm gears and said first and second gear portions are worms having the same pitch direction whereby the rotation of said first gear is opposite to that of said second gear.

14. The mechanism of claim 13 wherein said one of said worms has a different pitch angle than that of the other of said worms whereby said first and second gears are also driven at different rates.

* * * * *